(12) United States Patent
Tikkanen et al.

(10) Patent No.: US 9,513,456 B2
(45) Date of Patent: Dec. 6, 2016

(54) LENS DRIVER CIRCUIT WITH RINGING COMPENSATION

(71) Applicant: Texas Instruments Incorporated, Dallas, TX (US)

(72) Inventors: Jussi Petteri Tikkanen, Haukipudas (FI); Juha Jorma Sakari Karttunen, Oulu (FI)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/310,605

(22) Filed: Jun. 20, 2014

(65) Prior Publication Data

US 2015/0370031 A1 Dec. 24, 2015

(51) Int. Cl.
G03G 13/34 (2006.01)
G02B 7/02 (2006.01)

(52) U.S. Cl.
CPC ............. G02B 7/023 (2013.01); H02P 25/034 (2016.02)

(58) Field of Classification Search
CPC .............................. G02B 7/023; H02P 25/028
USPC ........................................................ 396/133
See application file for complete search history.

(56) References Cited

U.S. PATENT DOCUMENTS

| 8,222,841 | B2* | 7/2012 | Lule ................... H02K 41/0356 318/119 |
| 8,698,431 | B2 | 4/2014 | Murata |
| 8,724,016 | B2 | 5/2014 | Tsai |
| 2007/0047942 | A1 | 3/2007 | Chang et al. |
| 2013/0169857 | A1* | 7/2013 | Christo .............. H04N 5/23212 348/349 |

OTHER PUBLICATIONS

PCT Search Report for Application No. PCT/US 2015/037037, dated Oct. 1, 2015.

* cited by examiner

*Primary Examiner* — Rodney Fuller
(74) *Attorney, Agent, or Firm* — Andrew Viger; Frank D. Cimino

(57) ABSTRACT

A lens driver circuit determines the resonant frequency at a number of positions that a lens can move to so that the lens can move from an old position to a new position in two steps where the second step occurs a delay time after the first step. The delay time can be one-half of the period of the resonant frequency at the new position.

18 Claims, 5 Drawing Sheets

LENS DRIVER CIRCUIT WITH RINGING COMPENSATION

BACKGROUND OF THE INVENTION

1. Field of the Invention

The present invention relates to a lens driver circuit and, more particularly, to a lens driver circuit with ringing compensation.

2. Description of the Related Art

A voice coil motor (VCM) is a well-known structure that includes a body, a coil that is attached to the body, and a permanent magnet that surrounds the coil. A VCM is operated by passing a current through the coil. The current passing through the coil generates a magnetic field which reacts with the magnetic field from the permanent magnetic to move the coil and the body.

VCMs were originally developed as a means to drive a loudspeaker cone, which functions as the body of the VCM. When a current that represents an audio waveform is passed through the coil, the resulting current-generated magnetic field reacts with the magnetic field from the permanent magnet to move the loudspeaker cone which, in turn, generates sound pressure waves that reproduce the original sound.

One well-known variation of the original VCM is to include a spring that is attached to the body. When a spring is utilized, a current can be passed through the coil so that the reacting magnetic fields move the coil and the body to compress the spring, with the position of the coil and the body determined by balancing the magnetic and spring forces. The energy stored in the compressed spring can then be used to return the coil and the body to a previous position, thereby saving energy.

Spring-based VCMs are frequently used in low-power electronic applications. For example, in a compact camera application, such as the compact camera modules used in smartphones, the magnitude of the current passing through the coil can be incrementally increased. The incremental increase in current causes the coil and the body to incrementally move and step a lens, which is attached to the body of the VCM, through a number of focal positions to find an in-focus position for the lens. The movement of the combined structure, which includes the coil, the lens, and the body, compresses the spring, which is then used to return the combined coil, lens, and body structure to a previous position.

One problem with using a spring-based camera VCM to move a lens through a number of focal positions is that when the coil, lens, and body structure reaches a desired position, the momentum of the moving structure causes the spring, and thereby the coil, lens, and body structure connected to the spring, to oscillate around the desired position for a period of time before stopping at the desired position. This oscillation around the desired position is commonly known as ringing.

The time required for the oscillation or ringing to stop can significantly increase the time required to find an in-focus position for the lens when the lens must step through a number of positions in a very short period of time. Thus, there is a need for an approach that substantially reduces the oscillation or ringing.

SUMMARY OF THE INVENTION

The present invention provides a lens driver circuit with ringing compensation. A lens driver circuit of the present invention includes a voice coil motor (VCM). The VCM has a coil, lens, and body structure, and a spring that is attached to the coil, lens, and body structure. Further, the VCM has a current driver that is connected to a coil of the coil, lens, and body structure. The current driver drives a first amount of current through the coil. The first amount of current flowing through the coil generates a magnetic field that causes the coil, lens, and body structure to move from an old position towards a new position. The current driver to further drive a second amount of current through the coil a delay time after the first amount of current was driven to leave the coil, lens, and body structure centered at the new position, and substantially reduce an oscillation of the coil, lens, and body structure around the first new position.

The present invention also includes a method of moving a structure from an old position to a new position. The method includes determining a delay time, and driving a first amount of current through a coil. The coil is attached to the structure so that when the coil moves the structure moves an equivalent distance. The first amount of current flowing through the coil generates a magnetic field that causes the coil and the structure to move from the old position towards the new position. The method also includes driving a second amount of current through the coil a delay time after the first amount of current was driven to substantially reduce an oscillation of the structure around the new position.

A better understanding of the features and advantages of the present invention will be obtained by reference to the following detailed description and accompanying drawings which set forth an illustrative embodiment in which the principals of the invention are utilized.

DETAILED DESCRIPTION OF THE INVENTION

Figure 1:
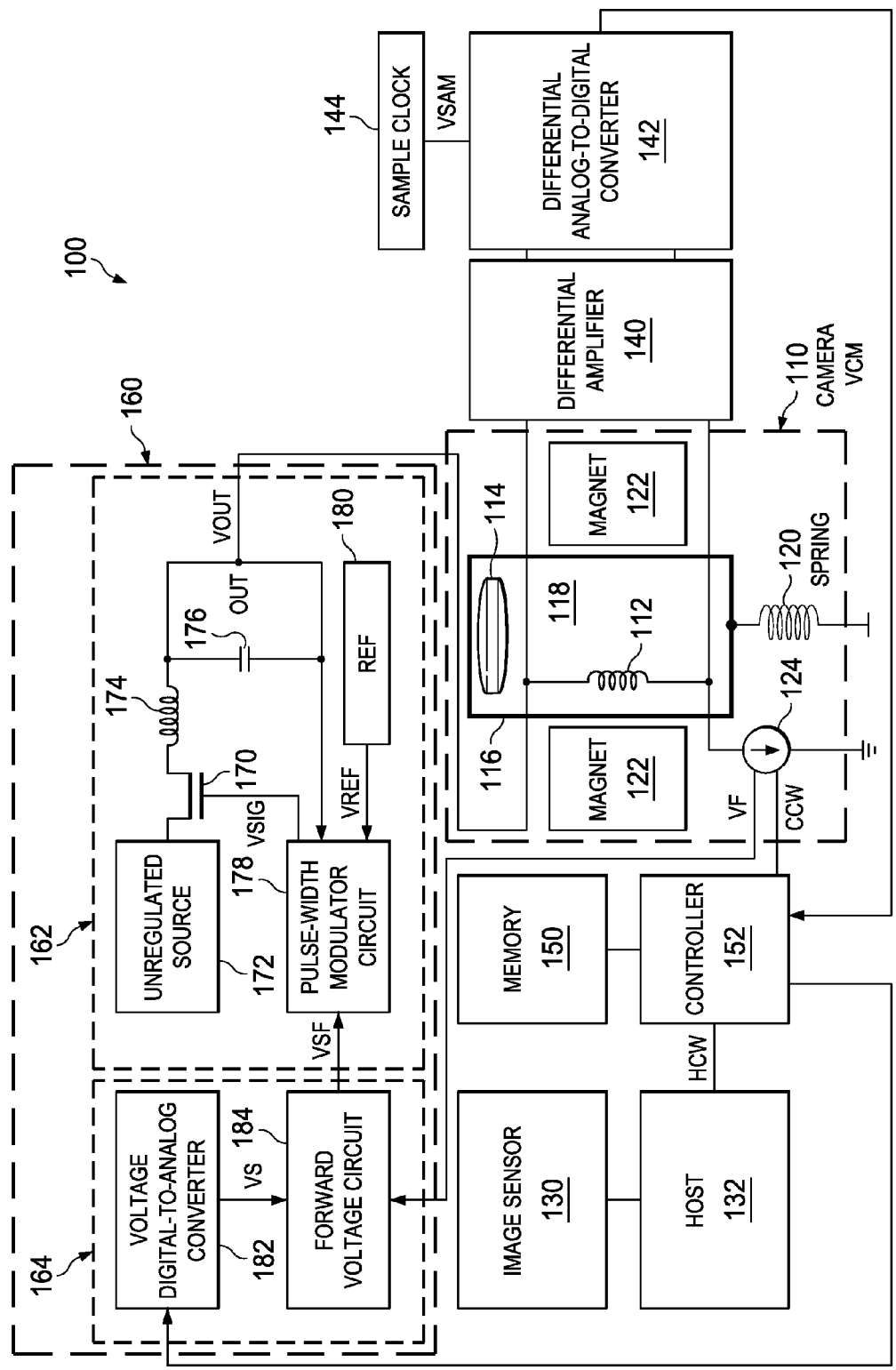
FIG. 1 is a block diagram illustrating an example of a lens driver circuit 100 in accordance with the present invention.

FIG. 1 shows a block diagram that illustrates an example of a lens driver circuit 100 in accordance with the present invention. As described in greater detail below, lens driver circuit 100 moves the lens from any old position to any new position in two steps, where the second step occurs a delay time after the first step. In the present example, the delay time is equal to one-half of the period of the resonant frequency at the new position. Lens driver circuit 100 also determines the resonant frequency at a number of calibration positions so that a resonant frequency can be determined for each position.

As shown in FIG. 1, lens driver circuit 100 includes a conventional camera voice coil motor (VCM) 110. Camera VCM 110 includes a coil 112, a lens 114, and a body 116 that is attached to coil 112 and lens 114 to form a coil, lens, and body structure 118 where the movement of coil 112 moves lens 114 and body 116 an equivalent distance.

Camera VCM 110 also includes a spring 120 that is attached to body 116, and a permanent magnet 122 that surrounds coil 112. In addition, camera VCM 110 includes a current driver 124 that is connected to coil 112. Current driver 124 includes a digital-to-analog (D/A) converter that converts digital control words into analog voltages.

In operation, current driver 124 sinks a current in response to a current control word CCW, which defines a magnitude of the current to be sunk. The current, which passes through coil 112, generates a magnetic field which reacts with the magnetic field from permanent magnetic 122 to move coil, lens, and body structure 118. The movement of coil, lens, and body structure 118 compresses spring 120, with the position of coil, lens, and body structure 118 determined by balancing the magnetic and spring forces.

The end of spring 120 that is connected to body 116 can move a maximum distance from a neutral (not compressed and not stretched) position to a fully compressed position. Spring 120 also has a usable distance that is measured from the neutral position, toward the fully compressed position, to an end position. The usable distance, which is less than the maximum distance, allows for oscillation at the end position without body 116 hitting the fully compressed position. In the present example, a usable distance of 300 um is utilized.

The usable distance is divided into a number of positions, which includes a number of search positions. Camera manufacturers typically specify how far a lens must move between each adjacent pair of search positions. For example, camera manufacturers often specify that lens 114 must be movable from one search position to a next search position at increments of 30 um.

In the present example, the usable distance is divided into 1000 positions, which includes 10 search positions spaced 30 um apart. Since the usable range in the present example is 300 um, lens 114 has 10 different search positions (e.g., 30, 60, 90, 120, 150, 180, 210, 240, 270, and 300 um) from the neutral position (0 um).

In addition, current driver 124 has a maximum current that is required to move coil, lens, and body structure 118 the usable distance from the neutral position to the end position. In the present example, a maximum current of 100 mA is utilized to move coil, lens, and body structure 118 the usable distance of 300 um.

Further, many conventional camera VCMs have a start current requirement, which is a minimum current that is required before the coil, lens, and body structure will move any distance. In the present example, camera VCM 110 has a start current requirement of 25 mA, which means that coil, lens, and body structure 118 does not move in response to 25 mA, but does move in response to 25.1 mA. Since the maximum current in the present example is 100 mA with a start current requirement of 25 mA, the present example has 75 mA of available current to move coil, lens, and body structure 118.

Further, a linear increase in current results in a substantially linear movement of coil, lens, and body structure 118. Thus, the required increase in current to move coil, lens, and body structure 118 from one position to a next position is substantially the same for each adjacent pair of positions.

In the present example, since coil, lens, and body structure 118 moves from 0 (the neutral position) to 10 different search positions, and since there are 75 mA of current available to move coil, lens, and body structure 118, then coil, lens, and body structure 118 requires an increase in current of 7.5 mA to move lens 114 of coil, lens, and body structure 118 from one search position to a next search position.

Lens driver circuit 100 additionally includes an image sensor 130, such as a CMOS sensor or a charge coupled device (CCD), and a host 132. Image sensor 130 converts the light from an image, which passes through lens 114, into an electrical signal. The movement of lens 114 of coil, lens, and body structure 118 through the positions changes the focus of the image on image sensor 130. Host 132 compares the electrical signals from the images at a number of different positions to search for a position that provides the optimum focus for the image.

Lens driver circuit 100 additionally includes a differential amplifier 140 that is connected to the ends of coil 112, a differential analog-to-digital (A/D) converter 142 that is connected to differential amplifier 140, and a sample clock circuit 144 that is connected to differential A/D converter 142. Differential amplifier 140 amplifies a voltage across coil 112, while differential A/D converter 142 digitizes the amplified voltage at a rate defined by a sample clock signal VSAM that is output by sample clock circuit 144.

As further shown in FIG. 1, lens driver circuit 100 includes a memory 150 and a controller 152 that is connected to current driver 124, host 132, and memory 150. Controller 152 receives a host control word HCW from host 132 and, in response, outputs the current control word CCW to current driver 124 to control the movement of coil, lens, and body structure 118. The host control word HCW has a number of bits that define a number of different host control words HCW. For example, the host control words HCW can include a calibration word that starts a calibration routine, and a position word that identifies a specific position.

The current control word CCW has a number of bits that define a number of different current control words CCW. (Each current control word CCW defines a magnitude of the current to be sunk by current driver 124.) In the present example, the current control word CCW has 10 bits which define 1024 different current control words, of which 1000 of the current control words are utilized in the present example to represent the 1000 positions.

Since 1000 current control words CCW and 1000 positions are utilized in the present example to specify 100 mA of current, each successive current control word CCW increments the position by one and the current by 0.1 mA from a previous current control word CCW. Thus, incrementing the current by 0.1 mA beyond the start current moves coil, lens, and body structure 118 from one position to a next position.

In operation, coil, lens, and body structure 118 moves from an old position to a new position in two steps by breaking the current required to move lens 114 from the old position to the new position into two parts. In other words, the current sunk through coil 112 by current driver 124 is increased by a first amount of current. The first amount of current flowing through coil 112 generates a magnetic field which reacts with the magnetic field from permanent magnet 122 to move coil, lens, and body structure 118 from the old position toward the new position. After a period of time, the current is increased by a second amount of current to leave coil, lens, and body structure 118 centered at the new position, and substantially reduce the oscillation of coil, lens, and body structure 118 around the new position.

The oscillation of coil, lens, and body structure 118 around the new position is defined to be substantially reduced when the oscillation is ≤3 um in 10 ms. Camera manufacturers often specify that lens 114 must be movable from an old search position to a new search position at increments of 30 um, and that the oscillation around the new search position must be ≤3 um in 10 ms.

The sum of the first amount of current and the second amount of current is equal to the total current that is required to move coil, lens, and body structure 118 from the old position to the new position in one step. However, by breaking the required current into two parts the oscillation or ringing of coil, lens, and body structure 118 due to the action of spring 120 can be substantially reduced.

The optimum magnitudes of the first amount of current and the second amount of current depend on a number of factors, including the spring construction, the weight of coil, lens, and body structure 118, and the structure used to guide the movement of coil, lens, and body structure 118. With these factors in place, along with the timing of the second amount of current, the optimum magnitudes of the first amount of current and the second amount of current can be experimentally determined by measuring the ringing that is associated with different combinations of the first and second amount of currents.

In the present example, coil, lens, and body structure 118 moves a distance of 30 um from one search position to a next search position in response to 7.5 mA. As a result, each 0.25 mA moves coil, lens, and body structure 118 a distance of 1 um. Further in the present example, to move from one search position to a next search position, 6.5 mA is utilized for the first amount of current, which moves coil, lens, and body structure 118 a distance of 26 um (excluding the ringing), and 1.0 um is utilized for the second amount of current, which moves coil, lens, and body structure 118 a distance of 1 um, for a total of 7.5 mA to move a distance of 30 um.

The following TABLE 1 summarizes the values used in the present example to step through each of the search positions.

TABLE 1

| | Current Control Word/ Position | Current Step | Total Current | Search Position | Distance Moved |
|---|---|---|---|---|---|
| | 250 | | 25 mA | 0 | 0 |
| Step 1 | 315 | 6.5 mA | 31.5 mA | | 26 um |
| Step 2 | 325 | 1 mA | 32.5 mA | 1 | 30 um |
| Step 1 | 390 | 6.5 mA | 39 mA | | 56 um |
| Step 2 | 400 | 1 mA | 40 mA | 2 | 60 um |
| Step 1 | 465 | 6.5 mA | 46.5 mA | | 86 um |
| Step 2 | 475 | 1 mA | 47.5 mA | 3 | 90 um |
| Step 1 | 540 | 6.5 mA | 54 mA | | 116 um |
| Step 2 | 550 | 1 mA | 55 mA | 4 | 120 um |
| Step 1 | 615 | 6.5 mA | 61.5 mA | | 146 um |
| Step 2 | 625 | 1 mA | 62.5 mA | 5 | 150 um |
| Step 1 | 690 | 6.5 mA | 69 mA | | 176 um |
| Step 2 | 700 | 1 mA | 70 mA | 6 | 180 um |
| Step 1 | 765 | 6.5 mA | 76.5 mA | | 206 um |
| Step 2 | 775 | 1 mA | 77.5 mA | 7 | 210 um |
| Step 1 | 840 | 6.5 mA | 84 mA | | 236 um |
| Step 2 | 850 | 1 mA | 85 mA | 8 | 240 um |
| Step 1 | 915 | 6.5 mA | 91.5 mA | | 266 um |
| Step 2 | 925 | 1 mA | 92.5 mA | 9 | 270 um |
| Step 1 | 990 | 6.5 mA | 99 mA | | 296 um |
| Step 2 | 1000 | 1 mA | 100 mA | 10 | 300 um |

When coil, lens, and body structure 118 is moved from an old position to a new position, the second amount of current is applied after the first amount of current a delay time later. In the present example, the delay time is equal to one-half of the period of the resonant frequency that is present at the new position when coil, lens, and body structure 118 is moved from the old position to the new position in one step.

Applying the second amount of current a delay time later substantially reduces the amount of ringing at the new position. This is because the action of spring 120 and the momentum of coil, lens, and body structure 118 moving from the old position cause coil, lens, and body structure 118 to move past the new position to an outer position where coil, lens, and body structure 118 slows down and momentarily comes to a stop. As coil, lens, and body structure 118 moves past the new position to the outer position, spring 120 stores energy.

After momentarily stopping, coil, lens, and body structure 118 moves back toward the new position while releasing the stored energy. The second amount of current is applied just before coil, lens, and body structure 118 reaches the new position, which in the present example is one-half of the period of the resonant frequency at the new position later. The energy in the second amount of current substantially cancels out the remaining stored energy in spring 120 and leaves coil, lens, and body structure 118 centered at the new position with very little oscillation around the new position.

Controller 152 determines the delay time from the new position, a first resonant frequency at a first calibration position, and a second resonant frequency at a second calibration position. Controller 152 determines the resonant frequencies for the first and second calibration positions using information collected during a calibration routine. Controller 152 initiates the calibration routine in response to the calibration word from host 132.

In the calibration routine, controller 152 first determines the resonant frequencies for two calibration positions that lie at roughly 25% and 75% of the usable range. In the present example, position 2, which is 60 um or 20% of the usable range, is utilized as the first calibration position, and position 7, which is 210 um or 70% of the usable range, is utilized as the second calibration position.

The resonant frequencies for the calibration positions are determined by first measuring a stationary voltage that lies across coil 112 when spring 120 is in the neutral position and coil, lens, and body structure 118 is not moving. The voltage across coil 112 is amplified by differential amplifier 140, digitized by differential A/D converter 142, and provided to controller 152, which stores the value of the stationary voltage in memory 150.

After the stationary voltage has been determined, controller 152 outputs a current control word CCW to current driver 124 that moves coil, lens, and body structure 118 from the neutral position to the first calibration position in a single step. In the present example, controller 152 outputs a current control word CCW to current driver 124 that moves coil, lens, and body structure 118 from position 0 (the neutral position) to search position 2 (the first calibration position) in a single step. In the present example, the current control word CCW commands current driver 124 to sink 40 mA to move coil, lens, and body structure 118 from position 0 to position 400 (search position 2/first calibration position) at 60 um of the usable distance.

Once in the first calibration position, amplifier 140 amplifies a DC-biased sinusoidal voltage that lies across coil 112. When coil 112 moves to the first calibration position in a single step, coil, lens, and body structure 118 oscillate around the first calibration position due to the mechanical action of spring 120 and the momentum of coil, lens, and body structure 118. As coil, lens, and body structure 118 oscillate, coil 112 moves back and forth within the magnetic field of permanent magnetic 122.

A coil moving into a magnetic field induces a voltage across the coil, and a coil oscillating into and out of a magnetic field induces a sinusoidal voltage that matches the movement of the coil. Since the spring has a dampened motion (the spring will eventually stop moving), the sinusoidal voltage induced across the coil has a dampened sinusoidal waveform. Since the stationary voltage is present, a DC-biased sinusoidal voltage results where the sinusoidal voltage rides on the stationary voltage.

The DC-biased sinusoidal voltage across coil 112 that is amplified by amplifier 140 is next converted into a series of digital values by differential A/D converter 142 at a sampling frequency, and then provided to controller 152. The sampling frequency is defined by the frequency of the sample clock signal VSAM output by sample clock circuit 144. In the present example, a sampling frequency of 40 KHz is utilized, which produces a 25 uS period.

After receiving the series of digital values that represent the DC-biased sinusoidal voltage across coil 112, controller 152 removes the stationary voltage component from the DC-biased sinusoidal voltage, which forms a digitized sinusoidal voltage that corresponds to the oscillation of coil, lens, and body structure 118 around the first calibration position.

Once the digitized sinusoidal voltage has been formed, controller 152 determines the frequency of the digitized sinusoidal voltage to determine the resonant frequency at the first calibration position. The frequency of the digitized sinusoidal voltage is the same as the resonant frequency of coil, lens, and body structure 118 as coil, lens, and body structure 118 oscillate around the first calibration position. The frequency of the digitized sinusoidal voltage can be determined by detecting the zero crossing points of the digitized sinusoidal voltage.

Sampling between two successive zero crossings is sampling over one half of a wavelength, whereas sampling between three successive zero crossings or two successive peaks is sampling over one wavelength. Alternately, a conventional autocorrelation algorithm, which is a method of identifying periodic signals from time domain samples, can be used to extract the resonant frequency from the digitized sinusoidal voltage. Once the resonant frequency of the digitized sinusoidal voltage has been determined for the first calibration position, the resonant frequency is stored in memory 150.

In the present example, where the first calibration position is at search position 2 (60 um), if 800 sampling clock pulses (each pulse with a 25 uS period) occur within one period of the digitized sinusoidal voltage, then the digitized sinusoidal voltage has a period equal to 800*25 uS=20 ms. The inverse of 20 ms yields a resonant frequency equal to 50 Hz.

Coil, lens, and body structure 118 is next returned to the neutral position, and then moved again to the first calibration position so that a second measure of the resonant frequency at the first calibration position can be determined. This process is repeated several more times, and an average measure of the resonant frequency is calculated for the first calibration position. In the present example, the resonant frequency at the first calibration position is determined five times, and the average value is utilized for the first calibration position at search position 2.

Once the average resonant frequency value for the first calibration position has been determined, controller 152 outputs a current control word CCW to current driver 124 that moves coil, lens, and body structure 118 from the neutral position to the second calibration position in a single step.

In the present example, controller 152 outputs a current control word CCW to current driver 124 that moves coil, lens, and body structure 118 from position 0 (the neutral position) to search position 7 (the second calibration position) in a single step. In the present example, the current control word CCW commands current driver 124 to sink 77.5 mA to move coil, lens, and body structure 118 from position 0 to position 775 (search position 7/second calibration position) at 210 um of the usable distance.

The DC-biased sinusoidal voltage at the second calibration position is then amplified and digitized in the same manner as with the first calibration position. Controller 152 removes the stationary voltage component from the DC-biased sinusoidal voltage, which forms a digitized sinusoidal voltage that corresponds to the oscillation of coil, lens, and body structure 118 around the second calibration position. Once the digitized sinusoidal voltage has been formed, controller 152 determines the frequency of the digitized sinusoidal voltage to determine the resonant frequency at the second calibration position.

The frequency of the digitized sinusoidal voltage is the same as the resonant frequency of coil, lens, and body structure 118 as coil, lens, and body structure 118 oscillate around the second calibration position. The frequency of the digitized sinusoidal voltage can be determined in the same fashion that the frequency for the first calibration position was determined, e.g., by detecting the zero crossing points of the digitized sinusoidal voltage, or using autocorrelation.

In the present example, where the second calibration position is at search position 7 (210 um), if 667 sampling clock pulses (each pulse with a 25 uS period) occur within one period of the sinusoidal voltage (peak-to-peak or three consecutive zero crossings), then the sinusoidal voltage has a period equal to 667*25 uS=16.675 ms. The inverse of 16.67 ms yields a resonant frequency equal to 60 Hz.

After the resonant frequencies for the two calibration positions have been determined, controller 152 is able to determine the resonant frequency for each remaining position. This then allows controller 152 to determine a half-period time for each position, which is the time in the present example that the second amount of current is applied.

The resonant frequencies of the mechanical oscillations of coil 112, lens 114, and body 116 are approximately linear from the neutral position to the end position. Thus, the resonant frequency at the first calibration position and the resonant frequency at the second calibration position can be used to define a line.

The period and half-period of the resonant frequency are inherent characteristics of the resonant frequency. As a result, defining a line using a resonant frequency at a calibration position also means defining the line using the period or half-period of the resonant frequency at the calibration position.

After the line has been formed, controller 152 determines the delay time from the line and the new position. In a graphical context, with an x-axis of position and a y-axis of resonant frequencies, the resonant frequency at a new position can be identified by determining where the new position intersects with the line.

To define a line, the slope m of the line is first determined with equation EQ. 1:

$$m = Ya - Yb/Xa - Xb \qquad \text{EQ. 1}$$

substituting in numbers from the above example where Ya=60 Hz, Yb=50 Hz, Xa=210 um, and Xb=60 um yields: (60−50)/210−60 or m=0.067 (the slope is dimensionless).

After the slope has been determined, a line is determined with equation EQ. 2

$$Y - Ya = m(X - Xa) \qquad \text{EQ. 2}$$

substituting in numbers from the above example yields: Y−60=−0.067(X−210 um) or Y=−0.067(X)+46 or 55 Hz at 135 um.

The delay time is then determined from the line (equation) and the new position. For example, the remaining 998 positions can then be entered into line equation EQ. 2 to determine the resonant frequencies for the remaining 998 positions. Once the resonant frequency values for each position have been determined, the period and half-period times for each position can be determined. (The period is the inverse of the frequency, and the half-period is half of the period.) Following this, the half-period time for each position (which in the present example is the delay time before the second amount of current is to be applied) can then be stored in memory 150 in a look-up table (LUT).

The following TABLE 2 illustrates the resonant frequency, period, and half-period times for each of the search positions.

TABLE 2

| Current Control Word/ Position | Beginning Search Position | Resonant Frequency | Period | Half Period |
| --- | --- | --- | --- | --- |
| 325 | 1-30 um | 48 Hz | 20.8 ms | 10.4 ms |
| 400 | 2-60 um | 50 Hz | 20.0 ms | 10.0 ms |
| 475 | 3-90 um | 52 Hz | 19.2 ms | 9.6 ms |
| 550 | 4-120 um | 54 Hz | 18.5 ms | 9.3 ms |
| 625 | 5-150 um | 56 Hz | 17.9 ms | 8.9 ms |
| 700 | 6-180 um | 58 Hz | 17.2 ms | 8.6 ms |
| 775 | 7-210 um | 60 Hz | 16.7 ms | 8.3 ms |
| 850 | 8-240 um | 62 Hz | 16.1 ms | 8.0 ms |
| 925 | 9-270 um | 64 Hz | 15.6 ms | 7.8 ms |
| 1000 | 10-300 um | 66 Hz | 15.2 ms | 7.6 ms |

Rather than using equation EQ. 2 to directly calculate the resonant frequency of a position, followed by minor calculations to determine the period and the half-period time of the position, and then storing the half-period time for each position in a LUT in memory 150, controller 152 can alternately calculate a half-period time from the line and the new position each time that a half-period time is needed.

The equations EQ. 3, EQ. 4, EQ. 5, and EQ. 6 can be used to calculate a half-period time T/2 of a position from the line and the new position each time that the half-period time T/2 for the position is needed.

$$f\_CAL2 = 40{,}000(f2-f1)(256)/(f1)(f2)(val2-val1) \quad \text{EQ. 3}$$

$$f\_CAL1 = (10{,}000/f1) + (val1 * f\_CAL2/1024) \quad \text{EQ. 4}$$

$$P = (f\_CAL1 - ((X/4) * f\_CAL2/256)) * 2 \quad \text{EQ. 5}$$

$$T/2 = P * T\_SAM \quad \text{EQ. 6}$$

where val1 and val2 are the two calibration positions, f1 and f2 are the resonant frequencies of the two calibration positions, T_SAM is the period of the sampling frequency (e.g., 25 us for a 40 kHz sampling frequency), and X is the new position for which the half-period time T/2 is to be determined.

Without a floating point unit the most efficient way to do division by a microcontroller is to use divisors which are in a power of 2 (2, 4, 8, 16, 32 . . . ) because that can be done by shifting the value to the right, instead of long codes for doing division. The constants 256, 10000, and 40000 in equations EQ. 3, EQ. 4, and EQ. 5 are required to perform the shifting. The equations EQ. 3, EQ. 4, and EQ. 5 provide a very efficient calculation in code.

In the present example, the half-period times identify the time at which the second amount of current is applied after the first amount of current has been applied. If a LUT is utilized, the determination of the half-period times for each position ends the calibration routine. If the equations EQ. 3, EQ. 4, and EQ. 5 are instead utilized, the calibration routine ends with the determination of the resonant frequencies at the two calibration positions, which is the information necessary to solve equation EQ. 5. The calibration routine can be performed as frequent or infrequent as desired to compensate for changing factors such as age and temperature.

Once the calibration routine has been completed, lens driver circuit 100 is ready to determine an in-focus position. Any of a number of conventional focus routines can be used to determine the in-focus position. For example, host 132 can command controller 152 by way of a series of position words to incrementally step coil, lens, and body structure 118 through each search position until an in-focus position has been identified between two search positions.

As coil, lens, and body structure 118 is incrementally stepped through the search positions, the image focus progressively gets better and then progressively gets worse. As a result, an in-focus position can be detected by identifying two search positions where the image focus goes from getting better to getting worse.

Once an in-focus position has been identified between two search positions, coil, lens, and body structure 118 can then be stepped back through a number of intermediate positions that lie between the two search positions with a smaller step, such as 3 um, until the image focus goes from getting better to getting worse.

Once an in-focus position has been identified between two intermediate positions, coil, lens, and body structure 118 can then be stepped forward through a number of focus positions with a smaller step, such as 1 um, until an optimum in-focus position is identified. Coil, lens, and body structure 118 can then be stepped to the optimum in-focus position.

Each time coil, lens, and body structure 118 is moved from any position to any other position, the movement occurs in two steps with the first amount of current and the second amount of current a delay time later, where in the present example the delay is equal to one-half of the period of the resonant frequency.

When host 132 outputs a position word to controller 152 that identifies a new position, controller 152 determines the current control word CCW that identifies the first amount of current to be output, the current control word CCW that identifies the second amount of current to be output, and the half-period time, which in the present example, is the delay between when the first and second amounts of current are applied.

In the present example, if host 132 commands controller 152 to move coil, lens, and body structure 118 from position 550 (search position 4) to position 625 (search position 5), controller 152 determines that current control word 615 is first output (where current control word 615 identifies the first amount of current) and then, after a 9.3 ms delay, current control word 625 is next output (where current control word 625 identifies the second amount of current).

After outputting the position word to controller 152, host 132 waits a predefined period of time. After the predefined period of time, host 132 captures and analyzes the electrical signal from image sensor 130 to determine a focus quality for the image that was captured at the position that corresponds to the position word.

As additionally shown in FIG. 1, lens driver circuit 100 also includes a power supply 160 that is connected to coil 112 so that coil 112 lies between and is connected to power supply 160 and current driver 124. Power supply 160 generates an output voltage VOUT. In the present example, power supply 160 is includes a buck converter circuit 162 and an adaptive power control circuit 164 that is connected to buck converter circuit 162.

Buck converter circuit 162 can be implemented in a number of different ways. In the present example, buck converter circuit 162 includes an NMOS transistor 170 that has a drain, a source, and a gate. The drain of NMOS transistor 170 is connected to an unregulated power source 172.

Buck converter circuit 162 also includes an inductor 174 that is connected to an output node OUT and the source of NMOS transistor 170, and a capacitor 176 that is connected to inductor 174 and the output node OUT. In addition, buck converter 162 include a pulse-width modulator (PWM) circuit 178 that is connected to the gate of NMOS transistor 170, the output node OUT, and a reference voltage source 180. In the present example, adaptive power control circuit 164 includes a forward voltage digital-to-analog converter (VDAC) 182 and a forward voltage circuit 184 that is connected to VDAC 182 and PWM circuit 178.

Controller 152 enables buck converter circuit 162 and adaptive power control circuit 164 to operate in one of two modes: a constant voltage mode and an adaptive voltage mode. In the present example, controller 152 sets buck converter circuit 162 and adaptive power control circuit 164 to the constant voltage mode during the calibration routine, and sets buck converter circuit 162 and adaptive power control circuit 164 to the adaptive voltage mode when host 132 is searching for an in-focus position.

When operating in the constant voltage mode, buck converter circuit 162 generates the output voltage VOUT with a substantially constant magnitude. PWM circuit 178 outputs an on-off signal VSIG to the gate of NMOS transistor 170 to turn NMOS transistor 170 on and off. PWM circuit 178 also compares the output voltage VOUT at the output node OUT to a reference voltage VREF from reference voltage source 180. PWM circuit 178 then adjusts the duty cycle of the on-off signal VSIG in response to the comparison so that the output voltage VOUT matches the reference voltage VREF.

When operating in the adaptive voltage mode, buck converter circuit 162 generates the output voltage VOUT with a variable magnitude that varies in response to a forward voltage control signal VSF. Adaptive power control circuit 164 generates the forward voltage control signal VSF in response to a difference between a reference forward voltage VS and a forward voltage VF across current driver 124.

A current driver (sink or source) needs forward voltage over the driving transistor to be able to control constant current. The forward voltage depends on design and set current (NMOS/PMOS), but typically is <0.1V. In the present example, controller 152 outputs a forward voltage word to VDAC 182, which outputs the reference forward voltage VS of, for example, 0.1V.

Forward voltage circuit 184 compares the referenced forward voltage VS output by VDAC 182 to the actual driver forward voltage VF output by current driver 124, and outputs the forward voltage control signal VSF to PWM circuit 178. The forward voltage control signal VSF is fed to the buck feedback loop of PWM circuit 178 (instead of the feedback pin).

PWM circuit 178 adjusts the timing of the on/off signal VSIG in response to the forward voltage control signal VSF. Now, when the current sunk by current driver 124 changes, it changes the forward voltage of the driver and that affects the feedback loop, changing the output voltage VOUT from buck converter circuit 162. Thus, the output voltage VOUT is controlled by current driver 124 which, in turn, is controlled by the current control word CCW output by controller 152.

A VCM can be considered as a resistive load so, for example, a 10 ohm VCM requires an output voltage of 0.5V when the current driver sinks 50 mA. Driving this from a battery (~3.7V) is very inefficient (~40%) as there is a big voltage drop in the driver (2.2V with 150 mA).

Adaptive power control circuit 164 follows the driver headroom voltage, thus automatically controlling the required output voltage to an optimal value. For example, with a 10 ohm VCM an output voltage VOUT of only 0.6V (0.1V+0.5V) would be required when the current driver sinks 50 mA and, when the current rises to 75 mA, the output voltage VOUT rises to 0.85V.

This control is an analog voltage feedback to PWM circuit 178 and is not directly affected by the current control word CCW output to current driver 124. This allows PWM circuit 178 to track the minimum forward voltage requirement of the driver, thus tracking maximum required voltage to drive the loads, optimizing power efficiency. The control loop is automatic, so when enabled the control loop tracks driver voltage and there is no need for controller/user intervention. When the current control word CCW changes, the current changes which changes the voltage across the VCM and forward voltage of the driver, which then changes the output voltage VOUT output from power supply circuit 160. The use of adaptive power control circuit 164 substantially improves power efficiency.

Figure 2:
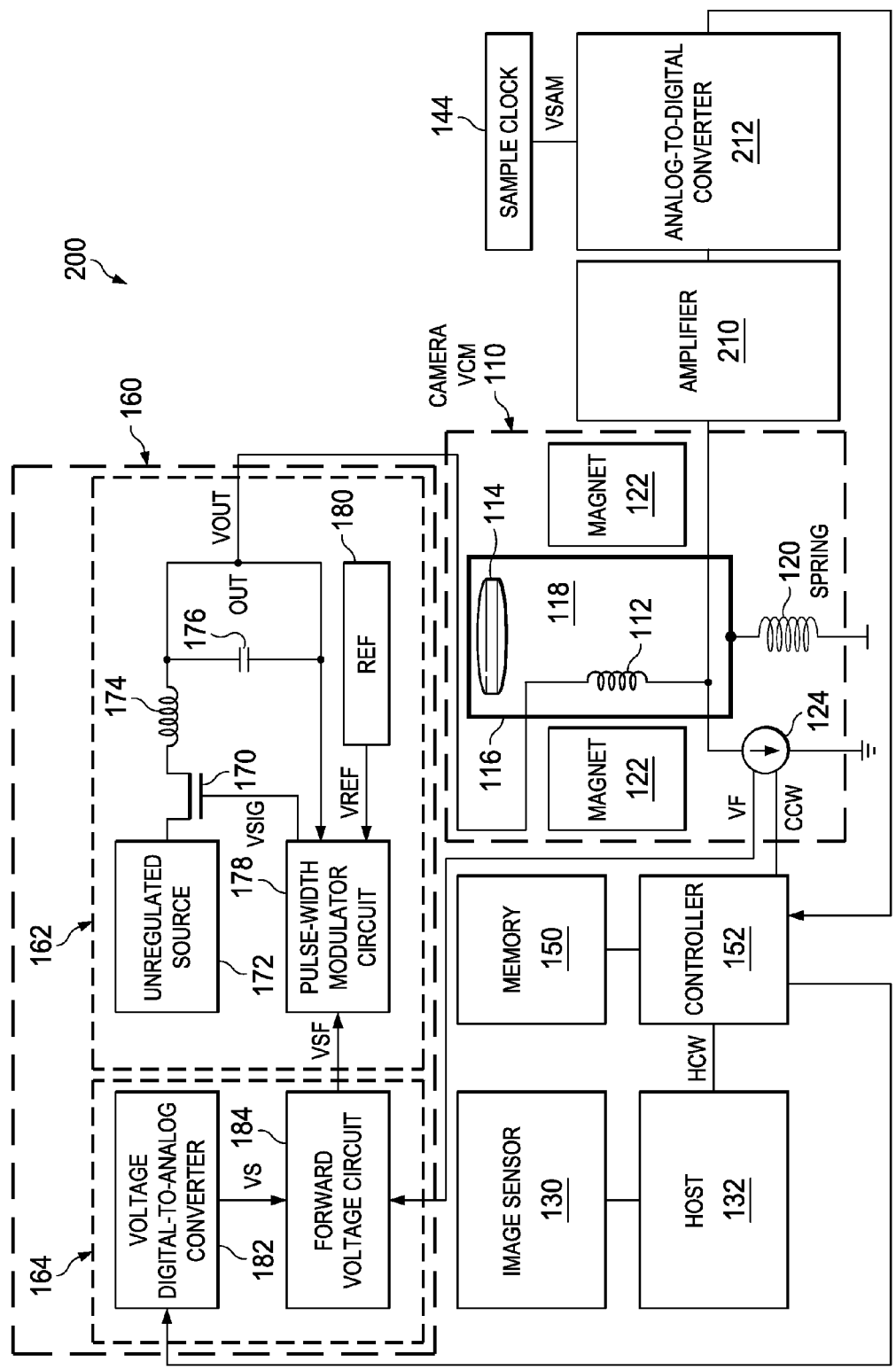
FIG. 2 is a block diagram illustrating an example of a lens driver circuit 200 in accordance with an alternate embodiment of the present invention.

FIG. 2 shows a block diagram that illustrates an example of a lens driver circuit 200 in accordance with an alternate embodiment of the present invention. Lens driver circuit 200 is similar to lens driver circuit 100 and, as a result, utilizes the same reference numerals to designate the structures which are common to both circuits.

As shown in FIG. 2, lens driver circuit 200 differs from lens driver circuit 100 in that lens driver circuit 200 utilizes an amplifier 210 and an A/D converter 212 in lieu of differential amplifier 140 and differential A/D converter 142, respectively, to measure a voltage across current driver 124.

The DC-biased sinusoidal voltage that lies across coil 112 also lies across current driver 124. Thus, rather than measuring the DC-biased sinusoidal voltage across coil 112, the DC-biased sinusoidal voltage can optionally be measured across current driver 124. The digitized DC-biased sinusoidal voltage output by A/D converter 212 is processed by controller 152 to determine a resonant frequency in the same manner as the digitized DC-biased sinusoidal voltage output by differential A/D converter 142. Lens driver circuit 200 otherwise operates the same as lens driver circuit 100.

Figure 3:
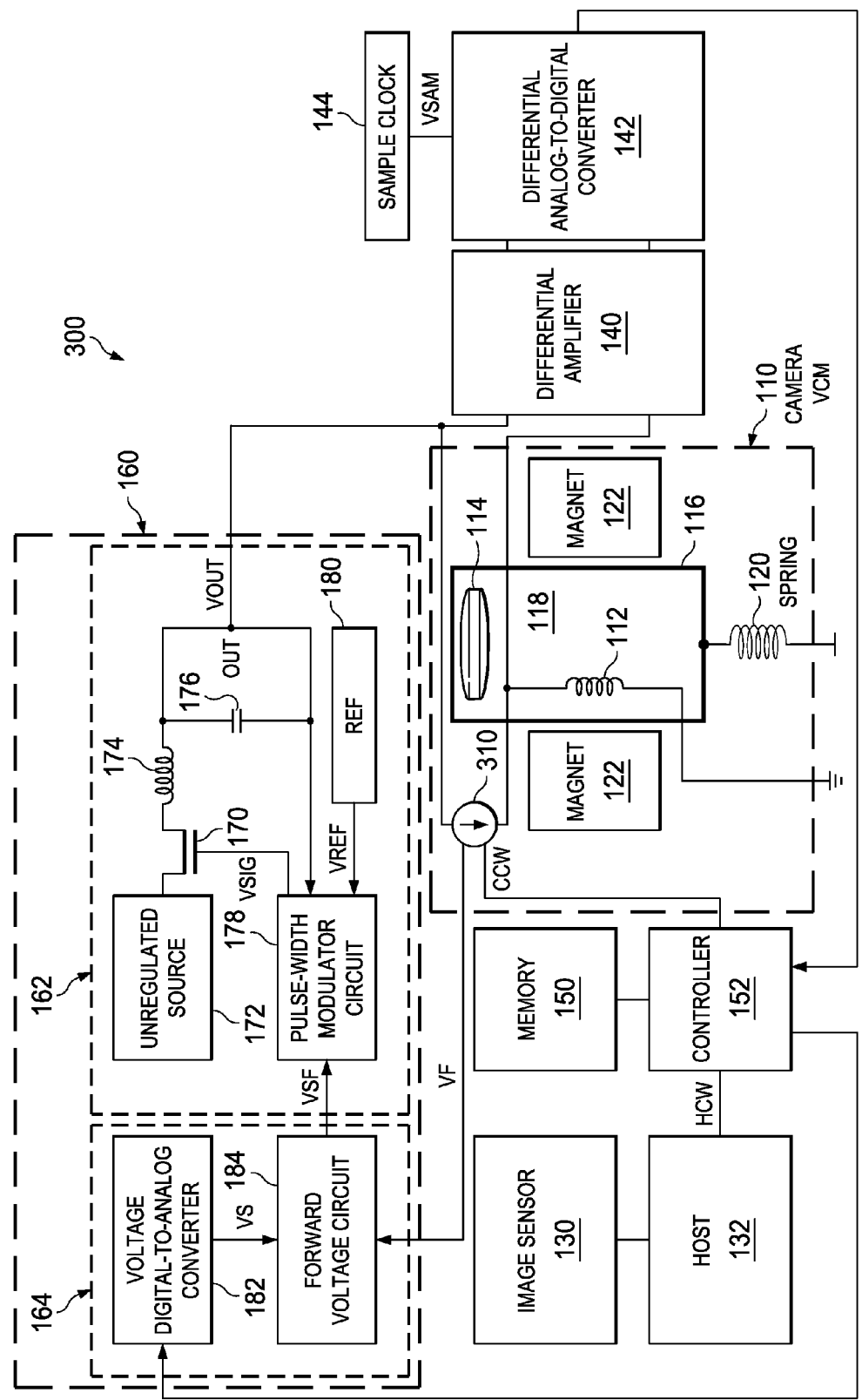
FIG. 3 is a block diagram illustrating an example of a lens driver circuit 300 in accordance with an alternate embodiment of the present invention.

FIG. 3 shows a block diagram that illustrates an example of a lens driver circuit 300 in accordance with an alternate embodiment of the present invention. Lens driver circuit 300 is similar to lens driver circuit 100 and, as a result, utilizes the same reference numerals to designate the structures which are common to both circuits.

As shown in FIG. 3, lens driver circuit 300 differs from lens driver circuit 100 in that in lens driver circuit 300 utilizes a current driver 310 in lieu of current driver 124. Current driver 310 is the same as current driver 124 except that current driver 310 sources current and lies between and is attached to coil 112 and power supply 160.

Lens driver circuit 300 also differs from lens driver circuit 100 in that differential amplifier 140 of lens driver circuit 300 is connected across current driver 310. Alternately, differential amplifier 140 of lens driver circuit 300 can be connected across coil 112 in the same fashion as shown in FIG. 1. Lens driver circuit 300 otherwise operates the same as lens driver circuit 100.

Figure 4:
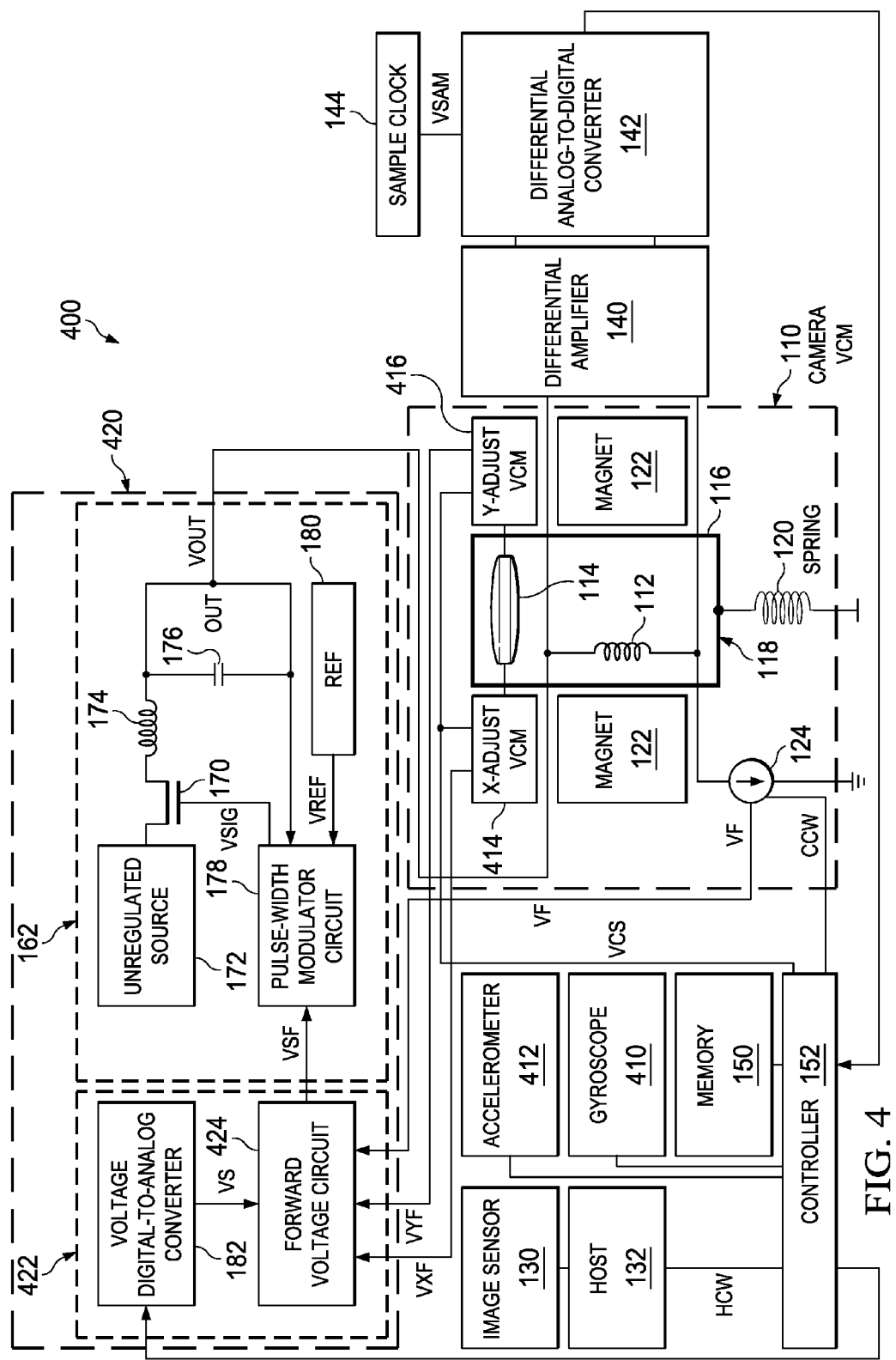
FIG. 4 is a block diagram illustrating an example of a lens driver circuit 400 in accordance with an alternate embodiment of the present invention.

FIG. 4 shows a block diagram that illustrates an example of a lens driver circuit 400 in accordance with an alternate embodiment of the present invention. Lens driver circuit 400 is similar to lens driver circuit 100 and, as a result, utilizes the same reference numerals to designate the structures which are common to both circuits.

As shown in FIG. 4, lens driver circuit 400 differs from lens driver circuit 100 in that lens driver circuit 400 utilizes a VCM 410 in lieu of VCM 110. VCM 410 is the same as VCM 110, except that VCM 410 also includes an X-adjust VCM 412 and a Y-adjust VCM 414 that are connected to coil, lens, and body 118 and controller 152. The X and Y adjust VCMS 412 and 414 can each be implemented with a conventional VCM.

The X and Y adjust VCMS 412 and 414 can tilt lens 114 so that the plane that lens 114 lies in can be tilted along two axes to compensate for camera motion that results from pitch, yaw, and/or roll. Alternately, the X and Y adjust VCMS 412 and 414 can shift lens 114 so that the plane that lens 114 lies in can be shifted along two axes to compensate for camera motion that results from pitch, yaw, and/or roll. (Lens tilt requires more Z height than lens shift (X/Y)).

As further shown in FIG. 4, lens driver circuit 400 differs from lens driver circuit 100 in that lens driver circuit 400 also includes a gyroscope 416 that is connected to controller 152, and an accelerometer 418 that is connected to controller 152. Gyroscope 416, which can be implemented with a conventional micro-electromechanical system (MEMS) chip, measures angular motion of lens 114 based on which direction is down toward the Earth's center. Accelerometer 418, which can also be implemented with a conventional MEMS chip, measures non-gravitational linear acceleration. Gyroscope 416 outputs a gyro word GW to controller 152, and accelerometer 418 outputs an accel word AW to controller 152, both of which both provide the motion information to controller 152 that controls the x-y movement of lens 114.

At the neutral position of spring 120, the image formed at the focal point of lens 114 lies a long distance away. When capturing an image that is a long distance away, angular motion dominates the image blur while linear motion has little effect. At the end position of spring 120, the image formed at the focal point of lens 114 lies very close. When capturing an image that is very close, linear motion can cause image blur that gyroscope 416 does not detect.

In operation, host 132 outputs an in-focus position to controller 152, which then detects the gyro word GW from gyroscope 416 and the accel word AW from accelerometer 418. Using the in-focus position, controller 152 generates and outputs an X-Y control signal VCS, which includes an X-axis control signal and a Y-axis control signal, to the X and Y adjust VCMS 412 and 414.

The X-Y control signal VCS changes the X-Y position of lens 114 (by tilting or shifting lens 114) to compensate for angular and linear movement. The X-Y control signal VCS, in turn, represents a weighted value of angular motion from the gyro word GW and linear motion from the accel word AW, whose weighting depends on the in-focus position.

For example, when an in-focus position corresponds with the neutral position of spring 120 (infinity), controller 152 utilizes only the angular motion information in gyro word GW to generate the X-Y control signal VCS to adjust the X-Y position of lens 114. When an in-focus position corresponds with the end position of spring 120 (up close), controller 152 utilizes only the linear motion information in accel word AW to generate the X-Y control signal VCS to adjust the X-Y position of lens 114.

When an in-focus position lies between the neutral position and the end position of spring 120, controller 152 uses a weighted combination of the angular motion information in gyro word GW and the linear motion information in accel word AW to generate the X-Y control signal VCS to adjust the X-Y position of lens 114.

The proper weighted balance of the angular motion information from gyroscope 416 and the linear motion information from accelerometer 418 can be experimentally determined. Optionally, rather than tilting or shifting lens 114 only, the entire coil, lens, and body structure 118 can alternately be tilted or shifted to achieve the same result.

As further shown in FIG. 4, lens driver circuit 400 also differs from lens driver circuit 100 in that lens driver circuit 400 utilizes a power supply 420 in lieu of power supply 160. Power supply 420 is the same as power supply 160, except that power supply 420 utilizes an adaptive power control circuit 422 in lieu of adaptive power control circuit 164. Adaptive power control circuit 422 is the same as adaptive power control circuit 164 except that adaptive power control circuit 422 utilizes a forward voltage circuit 424 in lieu of forward voltage circuit 184.

Forward voltage circuit 424 is the same as forward voltage circuit 184 except that in addition to receiving a forward voltage VF from current driver 124, forward voltage circuit 424 also receives an x-adjust forward voltage VXF from the current driver in X-adjust VCM 414, and a y-adjust forward voltage VYF from the current driver in Y-adjust VCM 416.

Forward voltage circuit 424 compares the magnitudes of the forward voltage VF, the x-adjust forward voltage VXF, and the y-adjust forward voltage VYF, and selects the lowest value to be a minimum forward voltage. Forward voltage circuit 424 also compares the referenced forward voltage VS output by VDAC 182 to the minimum forward voltage, and outputs the forward voltage control signal VSF to PWM circuit 178 in response to the comparison.

PWM circuit 178 adjusts the timing of the on/off signal VSIG in response to the forward voltage control signal VSF. This allows PWM circuit 178 to track minimum forward voltage requirements of the drivers, thus tracking the maximum required voltage to drive the loads, thereby optimizing power efficiency.

The control loop is analog and automatic, so when enabled the control loop tracks the driver voltage and there is no need for controller/user intervention. Now, when the current sunk by current driver 124 changes, it changes the forward voltage of the driver and that affects the feedback loop, changing the output voltage VOUT from buck converter circuit 162.

Figure 5:
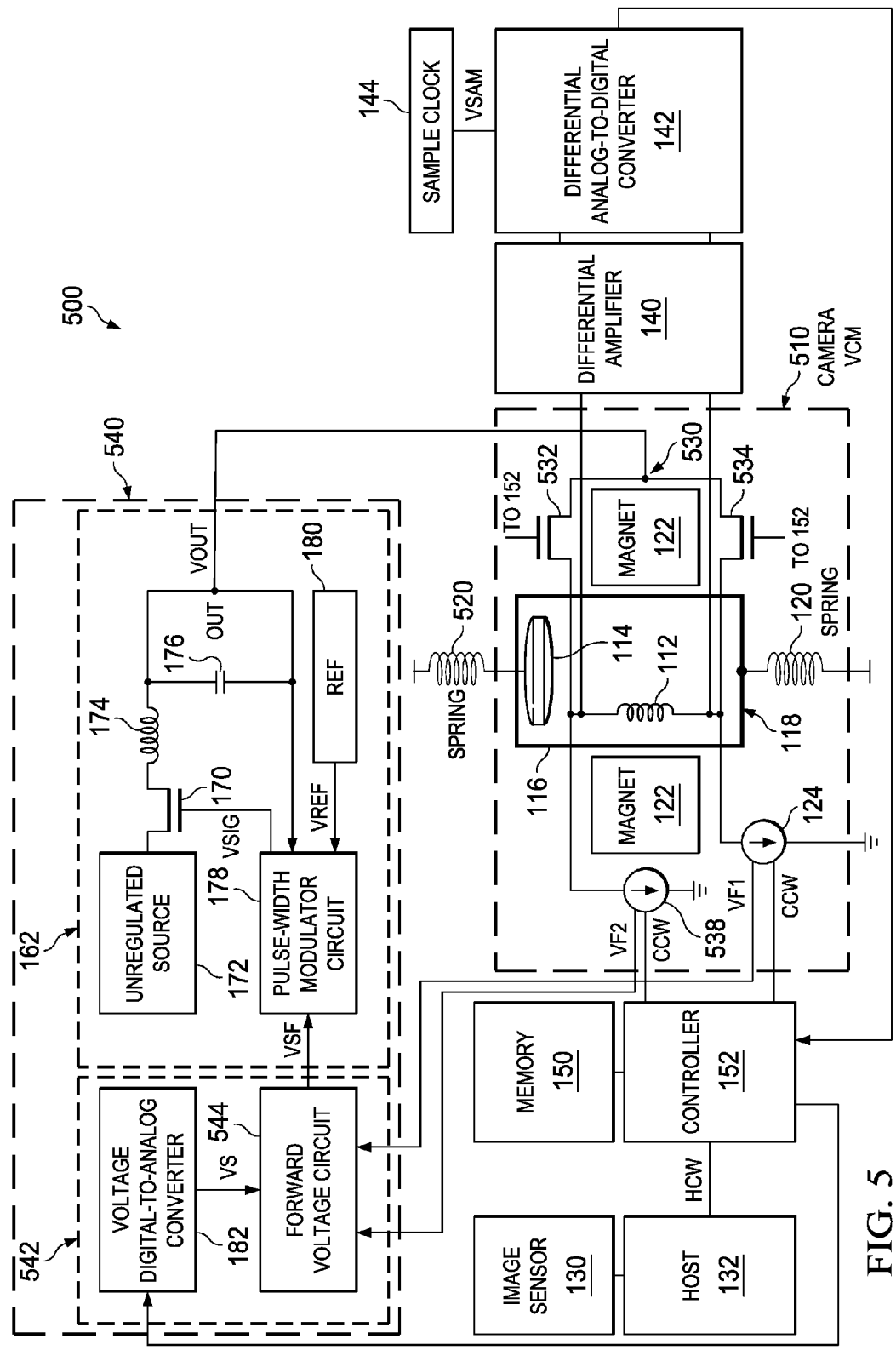
FIG. 5 is a block diagram illustrating an example of a lens driver circuit 500 in accordance with an alternate embodiment of the present invention.

FIG. 5 shows a block diagram that illustrates an example of a lens driver circuit 500 in accordance with an alternate embodiment of the present invention. Lens driver circuit 500 is similar to lens driver circuit 100 and, as a result, utilizes the same reference numerals to designate the structures which are common to both circuits.

As shown in FIG. 5, lens driver circuit 500 differs from lens driver circuit 100 in that lens driver circuit 500 utilizes a bi-directional VCM 510 in lieu of VCM 110. Bi-directional VCM 510 is similar to VCM 110 and, as a result, utilizes the same reference numerals to designate the structures which are common to both VCMS.

VCM 510 differs from VCM 110 in that VCM 510 includes a second spring 520 that is attached to body 116 of coil, lens, and body structure 118. Springs 120 and 520 are attached to the opposite ends of body 116, and placed so that both springs 120 and 520 are in the neutral (not compressed and not stretched) position. In the present example, the springs 120 and 520 are substantially identical. In addition, spring 120 and spring 520 each has a usable distance of 150 um. The combination of spring 120 and spring 520 has a usable distance of 300 um, which is the same as spring 120 in VCM 110.

As with VCM 110, the usable distance of lens driver circuit 500 is divided into 1000 positions, which includes 10 search positions spaced 30 um apart. However, unlike VCM 110, VCM 510 has a neutral position (0 um), 500 positive positions that include five positive search positions (e.g., +30, +60, +90, +120, and +150 um), and 500 negative positions that include five negative search positions (e.g., −30, −60, −90, −120, and −150 um).

VCM 510 also differs from VCM 110 in that VCM 510 utilizes an H-bridge circuit 530. H-bridge circuit 530 includes a NMOS transistor 532 and a NMOS transistor 534. NMOS transistor 532 has a gate connected to controller 152, a drain connected to the output OUT, and a source connected to a first end of coil 112. NMOS transistor 534 has a gate connected to controller 152, a drain connected to the output OUT, and a source connected to a second end of coil 112.

Further, VCM 510 differs from VCM 110 in that VCM 510 includes a second current driver 538. Current driver 124 is connected to the second end of coil 112, while current driver 538 is connected to the first end of coil 112. Current driver 538 includes a digital-to-analog (D/A) converter that converts digital control words from controller 152 into analog voltages.

In operation, when NMOS transistor 532 is on and NMOS transistor 534 is off, current driver 124 responds to a current control word CCW from controller 152 and sinks a current through coil 112 in a first direction. The current that passes through coil 112 generates a magnetic field which reacts with the magnetic field from permanent magnetic 122 to move coil, lens, and body structure 118.

When both of the springs 120 and 520 are in the neutral position, coil, lens, and body structure 118 moves in a positive direction that compresses spring 120 and stretches spring 520, with the position of coil, lens, and body structure 118 determined by balancing the magnetic and spring forces.

When NMOS transistor 532 is off and NMOS transistor 534 is on, current driver 538 sinks a current through coil 112 in a second opposite direction. The current that passes through coil 112 generates a magnetic field which reacts with the magnetic field from permanent magnetic 122 to move coil, lens, and body structure 118.

When both of the springs 120 and 520 are in the neutral position, coil, lens, and body structure 118 moves in a negative direction that compresses spring 520 and stretches spring 120, with the position of coil, lens, and body structure 118 determined by balancing the magnetic and spring forces.

In addition, VCM 510 further differs from VCM 110 in that VCM 510 requires no start current. However, although no start current is required, current driver 124 must sink a maximum current that can both compresses spring 120 and stretch spring 520. Similarly, current driver 538 must sink a maximum current that can both compresses spring 520 and stretch spring 120.

Further, a linear increase in current results in a substantially linear movement of coil, lens, and body structure 118. Thus, the required increase in current to move coil, lens, and body structure 118 from one position to a next position is substantially the same for each adjacent pair of positions.

In operation, coil, lens, and body structure 118 moves from an old position to a new position in two steps by breaking the current required to move lens 114 from the old position to the new position into two parts. In other words, the current sunk by a current driver, such as driver 124 or driver 538, is increased by a first amount of current to move coil, lens, and body structure 118 from the old position toward the new position and then, after a period of time, increased again by a second amount of current to leave coil, lens, and body structure 118 centered at the new position, and substantially reduce the oscillation of coil, lens, and body structure 118 around the new position.

The sum of the first amount of current and the second amount of current is equal to the total current that is required to move coil, lens, and body structure 118 from the old position to the new position in one step. However, by breaking the required current into two parts the oscillation or ringing of coil, lens, and body structure 118 due to the action of the springs 120 and 520 can be substantially reduced.

The optimum magnitudes of the first amount of current and the second amount of current depend on a number of factors, including the spring constructions, the weight of coil, lens, and body structure 118, and the structure used to guide the movement of coil, lens, and body structure 118. With these factors in place, along with the timing of the second amount of current, the optimum magnitudes of the first amount of current and the second amount of current can be experimentally determined by measuring the ringing that is associated with different combinations of the first and second amount of currents.

When coil, lens, and body structure 118 is moved from an old position to a new position, the second amount of current is applied after the first amount of current after a delay time. In the present example, the delay time is equal to one-half of the period of the resonant frequency that is present at the new position when coil, lens, and body structure 118 is moved from the old position to the new position in one step. Applying the second amount of current at this time substantially reduces the amount of ringing at the new position.

Controller 152 determines the resonant frequency for each position using information collected during a calibration routine. Controller 152 initiates the calibration routine in response to the calibration word from host 132. In the calibration routine, controller 152 first determines the resonant frequency for two calibration positions. In the present example, positive position 2, which is +60 um, is utilized as the first calibration position, and negative position 2, which is −60 um, is utilized as the second calibration position.

The resonant frequencies for the calibration positions are determined by first measuring a stationary voltage that lies across coil 112 when coil, lens, and body structure 118 is in the neutral position and not moving. The voltage across coil 112 is amplified by differential amplifier 140, digitized by differential A/D converter 142, and provided to controller 152, which stores the value of the stationary voltage in memory 150.

After the stationary voltage has been determined, controller 152 outputs a current control word CCW to current driver 124 that moves coil, lens, and body structure 118 from the neutral position to the first calibration position in a single step. In the present example, controller 152 outputs a current control word CCW to current driver 124 that moves coil, lens, and body structure 118 from position 0 (the neutral position) to positive search position 2 (the first calibration position) in a single step.

Once in the first calibration position, amplifier 140 amplifies the DC-biased sinusoidal voltage that lies across coil 112. The amplified DC-biased sinusoidal voltage across coil 112 is next converted into a series of digital values by differential A/D converter 142 at a sampling frequency, and then provided to controller 152. The sampling frequency is defined by the frequency of the sample clock signal VSAM output by sample clock circuit 144.

After receiving the series of digital values that represent the DC-biased sinusoidal voltage across coil 112, controller 152 removes the stationary voltage component from the DC-biased sinusoidal voltage, which forms a digitized sinusoidal voltage. One the digitized sinusoidal voltage has been formed, controller 152 determines the frequency of the digitized sinusoidal voltage.

The frequency of the digitized sinusoidal voltage is the same as the resonant frequency of coil, lens, and body structure 118 as coil, lens, and body structure 118 oscillate around the first calibration position. The frequency of the digitized sinusoidal voltage can be determined by detecting the zero crossing points of the digitized sinusoidal voltage. Alternately, a conventional autocorrelation algorithm can be used to extract the frequency from the digitized sinusoidal voltage. Once the frequency of the digitized sinusoidal voltage has been determined for the first calibration position, the frequency is stored in memory 150 as the resonant frequency.

Coil, lens, and body structure 118 is next returned to the neutral position, and then moved again to the first calibration position so that a second measure of the resonant frequency at the first calibration position can be determined. This process is repeated several more times, and an average measure of the resonant frequency is calculated for the first calibration position. In the present example, the resonant frequency at the first calibration position is determined five times, and the average value is utilized for the first calibration position at positive search position 2.

Once the average resonant frequency value for the first calibration position has been determined, controller 152 outputs a current control word CCW to current driver 538 that moves coil, lens, and body structure 118 from the neutral position to the second calibration position in a single step. In the present example, controller 152 outputs a current control word CCW to current driver 538 that moves coil, lens, and body structure 118 from position 0 (the neutral position) to negative search position 2 (the second calibration position) in a single step.

The DC-biased sinusoidal voltage at the second calibration position is then amplified and digitized in the same manner as with the first calibration position, and the resonant frequency for the second calibration position is determined in the same fashion that the resonant frequency for the first calibration position was determined.

After the resonant frequencies for the two calibration positions have been determined, controller 152 is able to determine the resonant frequency for each remaining position. The resonant frequencies of the mechanical oscillations of coil 112, lens 114, and body 116 are approximately linear from the neutral position to the positive and negative end positions (e.g., +150 um and −150 um). Thus, controller 152 can use equation EQ. 2 or equation EQ. 5 with the results from the two calibration positions to determine a half-period time for each position, which is the time in the present example that the second amount of current is applied.

Once the calibration routine has been completed, lens driver circuit 500 is ready to determine an in-focus position. Any of a number of conventional focus routines can be used to determine the in-focus position. For example, host 132 can command controller 152 by way of a series of position words to incrementally step coil, lens, and body structure 118 through the positive search positions until an in-focus position has been identified between two positive search positions or an in-focus position has been ruled out.

As coil, lens, and body structure 118 is incrementally stepped through the positive search positions, if the image focus progressively gets better and then progressively gets worse, then an in-focus position lies between two positive search positions that include the region where the image focus goes from getting better to getting worse.

However, if the image focus progressively gets worse, then an in-focus position can be ruled out. In this case, coil, lens, and body structure 118 is returned to the neutral position. After this, coil, lens, and body structure 118 is incrementally stepped through the negative search positions until an in-focus position has been identified between two negative search positions that include the region where the image focus goes from getting better to getting worse.

Once an in-focus position has been identified between two search positions, coil, lens, and body structure 118 can then be stepped back through a number of intermediate positions that lie between the two search positions with a smaller step, such as 3 um, until the image focus goes from getting better to getting worse.

Once an in-focus position has been identified between two intermediate positions, coil, lens, and body structure 118 can then be stepped forward through a number of focus positions with a smaller step, such as 1 um, until an optimum in-focus position is identified. Coil, lens, and body structure 118 can then be stepped to the optimum in-focus position.

Each time coil, lens, and body structure 118 is moved from any position to any other position, the movement occurs in two steps with the first amount of current and the second amount of current a delay time later, where the delay in the present example is equal to one-half of the period of the resonant frequency.

When host 132 outputs a position word to controller 152 that identifies a new position, controller 152 determines the current control word CCW that identifies the first amount of current to be output, the current control word CCW that identifies the second amount of current to be output, and the half-period time, which in the present example is the delay between when the first and second amounts of current are applied.

After outputting the position word to controller 152, host 132 waits a predefined period of time. After the predefined period of time, host 132 captures and analyzes the electrical signal from image sensor 130. When searching for an in-focus position, host 132 determines a focus quality for the image that was captured at the position that corresponds to the position word. When at in-focus position, host 132 stores the image that was captured at the position that corresponds to the position word.

As further shown in FIG. 5, lens driver circuit 500 also differs from lens driver circuit 100 in that lens driver circuit 500 utilizes a power supply 540 in lieu of power supply 160. Power supply 540 is the same as power supply 160, except that power supply 540 utilizes an adaptive power control circuit 542 in lieu of adaptive power control circuit 164.

Adaptive power control circuit 542 is the same as adaptive power control circuit 164 except that adaptive power control circuit 542 utilizes a forward voltage circuit 544 in lieu of forward voltage circuit 184.

Forward voltage circuit 544 is the same as forward voltage circuit 184 except that forward voltage circuit 544 receives a forward voltage VF1 from current driver 536, and a forward voltage VF2 from current driver 538. Forward voltage circuit 544 compares the magnitudes of the forward voltage VF1 and the forward voltage VF2, and selects the lowest value to be a minimum forward voltage. Forward voltage circuit 544 also compares the referenced forward voltage VS output by VDAC 182 to the minimum forward voltage, and outputs the forward voltage control signal VSF to PWM circuit 178 in response to the comparison.

PWM circuit 178 adjusts the timing of the on/off signal VSIG in response to the forward voltage control signal VSF. This allows PWM circuit 178 to track minimum forward voltage requirements of the drivers, thus tracking the maximum required voltage to drive the loads, thereby optimizing power efficiency.

The control loop is analog and automatic, so when enabled the control loop tracks the driver voltage and there is no need for controller/user intervention. Now, when the current sunk by current driver 124 or 538 changes, it changes the forward voltage of the driver and that affects the feedback loop, changing the output voltage VOUT from buck converter circuit 162.

Thus, a lens driver circuit with a number of embodiments has been disclosed. Each lens driver circuit collects the information required to determine a resonant frequency at each position. After this, each time coil, lens, and body structure 118 is moved from any position to any other position, the movement occurs in two steps with the first amount of current and the second amount of current a delay time later, where the delay in the present example is equal to one-half of the period of the resonant frequency.

It should be understood that the above descriptions are examples of the present invention, and that various alternatives of the invention described herein may be employed in practicing the invention. Thus, it is intended that the following claims define the scope of the invention and that structures and methods within the scope of these claims and their equivalents be covered thereby.

What is claimed is:

1. A system suitable for controlling focus position of a camera lens, comprising:
    a voice coil motor (VCM) having:
        a coil, lens, and body structure, and
        a first spring attached to the coil, lens, and body structure; and
    a lens driver circuit, including
        a first current driver coupled to the coil to drive:
            a first amount of current through the coil to generate a magnetic field that causes the lens to move from a first old position towards a first new position; and
            a second amount of current through the coil a delay time after the first amount of current is driven to move the lens to the new position, and substantially reduce an oscillation of the lens around the first new position; and
        a controller coupled to the first current driver to:
            determine a first resonant frequency at a first calibration position;
            determine a second resonant frequency at a second calibration position; and
            determine the delay time from the new position, the first resonant frequency at the first calibration position, and the second resonant frequency at the second calibration position.

2. The lens driver circuit of claim 1 wherein the controller determines the first resonant frequency at the first calibration position by:
    forming a first sinusoidal voltage that corresponds to an oscillation of the coil, lens, and body structure around the first calibration position; and
    determining a frequency of the first sinusoidal voltage to determine the first resonant frequency.

3. The lens driver circuit of claim 2 and further comprising an amplification and digitization circuit that measures a DC voltage across the coil when the coil, lens, and body structure lies stopped at a neutral position, and measures a DC-biased sinusoidal voltage across the coil when the coil, lens, and body structure oscillates around the first calibration position.

4. The lens driver circuit of claim 3 wherein the controller removes the DC bias voltage from the DC-biased sinusoidal voltage to form the first sinusoidal voltage.

5. The lens driver circuit of claim 2 and further comprising an amplification and digitization circuit that measures a DC voltage across the first current driver when the coil, lens, and body structure lies stopped at a neutral position, and measures a DC-biased sinusoidal voltage across the first current driver when the coil, lens, and body structure oscillates around the first calibration position.

6. The lens driver circuit of claim 5 wherein the controller removes the DC bias voltage from the DC-biased sinusoidal voltage to form the first sinusoidal voltage.

7. The lens driver circuit of claim 2 wherein the controller determines the second resonant frequency at the second calibration position by:
    forming a second sinusoidal voltage that corresponds to an oscillation of the coil, lens, and body structure around the second calibration position; and
    determining a frequency of the second sinusoidal voltage to determine the second resonant frequency.

8. The lens driver of claim 7 wherein the controller determines the delay time by:
    defining a line using the first resonant frequency at the first calibration position and the second resonant frequency at the second calibration position; and
    determining the delay time from the line and the new position.

9. The lens driver circuit of claim 8 wherein the delay time is equal to a half-period of the new resonant frequency at the new position.

10. The lens driver circuit of claim 1 and further comprising a power circuit connected to the VCM, the power circuit including:
    a buck converter circuit that generates an output voltage, the output voltage having a substantially constant magnitude in a first mode, and a variable magnitude in a second mode, the magnitude of the output voltage in the second mode to vary in response to a forward voltage control signal; and
    an adaptive voltage control circuit connected to the buck converter circuit, the adaptive voltage control circuit to output the forward voltage control signal in response to a difference between a reference forward voltage and a forward voltage across the first current driver.

11. The lens driver circuit of claim 1 and further comprising a power circuit connected to the VCM, the power circuit including:

a buck converter circuit that generates an output voltage, the output voltage having a substantially constant magnitude in a first mode, and a variable magnitude in a second mode, the magnitude of the output voltage in the second mode to vary in response to a forward voltage control signal; and an adaptive voltage control circuit connected to the buck converter circuit, the adaptive voltage control circuit to output the forward voltage control signal in response to a difference between a reference forward voltage and a minimum forward voltage, the minimum forward voltage being a lowest forward voltage across a plurality of current drivers.

12. The lens driver circuit of claim 1 wherein the coil lies between and connected to a power supply and the first current driver.

13. The lens driver circuit of claim 1 wherein the first current driver lies between and connected to a power supply and the coil.

14. The lens driver circuit of claim 1 and further comprising:
a gyroscope connected to the controller, the gyroscope to measure angular motion of a lens of the coil, lens, and body structure based on which direction is down toward the Earth's center, the gyroscope to output a gyro word to the controller that represents the measured angular motion; and
an accelerometer connected to the controller, the accelerometer to measure non-gravitational linear acceleration, the lens lies in a plane that can be moved along an axis to compensate for camera motion, the accelerometer to output an accel word to the controller that represents the measured linear motion.

15. The lens driver circuit of claim 14 wherein the VCM further includes:
a X-adjust VCM attached to the coil, lens, and body structure; and
a Y-adjust VCM attached to the coil, lens, and body structure, wherein the controller controls the X-adjust VCM and the Y-adjust VCM to control an x-y position of the lens in response to the new position, the gyro word, and the accel word.

16. The lens driver circuit of claim 1 and further comprising:
a second spring attached to the coil, lens, and body structure;
a second current driver connected to the coil of the coil, lens, and body structure, the second current driver to drive:
a first amount of current through the coil in a second direction, the first amount of current flowing through the coil in the second direction to generate a magnetic field that causes the coil, lens, and body structure to move from a second old position towards a second new position; and
a second amount of current through the coil in the second direction a delay time later to substantially reduce an oscillation of the coil, lens, and body structure around the second new position.

17. A method of controlling focus position of a camera lens with a voice coil motor (VCM) having a coil, lens, and body structure, the method comprising:
receiving a new position for the lens relative to an old position;
determining a delay time;
determining a first resonant frequency at a first calibration position;
determining a second resonant frequency at a second calibration position; and
determining the delay time from the new position, the first resonant frequency at the first calibration position, and the second resonant frequency at the second calibration position;
driving a first amount of current through the coil, generating a magnetic field that causes the lens to move from the old position towards the new position; and
driving a second amount of current through the coil the delay time after the first amount of current is driven to substantially reduce an oscillation of the structure around the new position.

18. The method of claim 17 wherein the delay time is equal to a half-period time of a resonant frequency at the new position.

* * * * *